Patented Nov. 22, 1927.

1,649,942

UNITED STATES PATENT OFFICE.

JAMES BROOKES BEVERIDGE, OF RICHMOND, VIRGINIA.

METHOD OF PRODUCING SULPHITE PULP.

No Drawing. Application filed June 9, 1925. Serial No. 36,038.

Sulphite pulp has heretofore generally been produced by the digestion of chips of spruce wood in a solution of calcium acid sulphite, sometimes with minor amounts of magnesium. This solution, however, does not produce a satisfactory paper pulp from jack pine, short and long leafed pines, Douglas fir and similar resinous woods because calcium produces insoluble compounds with the resins contained in these woods, and the formation of these insoluble calcium compounds prevents the thorough penetration of the wood by the cooking solution.

My invention lies in using a solution of magnesium acid sulphite containing varying amounts of alkali, sulphites and acid sulphites, such as sodium or ammonium, which solution produces a paper pulp from resinous woods equal to spruce sulphite pulp. This cooking solution prevents the formation of insoluble compounds and insures a thorough digestion of the wood chips as well as the production of high quality white pulp.

When calcium is used, the cooking solution must contain a large excess of sulphur dioxide over that required to produce the acid sulphite, to hold the calcium in solution, whereas a combination of magnesium and alkali, sulphites and acid sulphites allows the preparation of cooking solutions with no excess of sulphur dioxide over that necessary to form the acid sulphite. I have found that for certain grades of pulp, such a solution is advantageous, as higher temperatures can be used, thus shortening the digestion process; also higher percentage yield of paper pulp can be obtained.

While this cooking solution containing magnesium acid sulphite and alkali sulphites and acid sulphites is especially adapted for the production of paper pulp from pine and similar resinous woods, it can be used to advantage in the digestion of spruce and hemlock woods, and woods of deciduous trees such as poplar, gum, birch, etc.

By the variation of the ratio of combined and free sulphur dioxide and the total sulphur dioxide contained in the solution, I can produce first an easy bleaching white pulp; second, a strong unbleached white pulp; and, third, a "high-yield" pulp suitable for the production of the coarser grades of paper or board.

To produce easy bleaching pulp from pine woods, in practice I use a solution containing about 3.25% total $SO_2$ with 1.25% combined and 2% free. The bases magnesium and sodium, forming the sulphites, may be in any suitable proportions, say, for instance, approximately 50% magnesium and 50% sodium. To produce a high-yield strong pulp from deciduous woods, such as black gum, in practice I use a solution containing about 3.0% total $SO_2$ with 1.4% combined and 1.6% free, the bases magnesium and sodium forming the sulphite being in the proportion of approximately 30% magnesium and 70% sodium, or other suitable proportions. The total $SO_2$ contained and the proportions of the bases will be varied according to the specie of wood used and the character of the pulp desired.

The cooking solution may be produced from magnesium oxide or carbonate, and sodium hydroxide or carbonate, and ammonium hydroxide or carbonate, but I prefer, on account of low cost, to produce the solution in either one of the following methods:

1. I first prepare a clear solution of calcium acid sulphite by reacting on limestone or lime with sufficient sulphur dioxide in the presence of water, according to the well known method usually practiced in the art of manufacturing sulphite pulp. I next prepare a clear solution of sodium sulphate and magnesium sulphate from sodium acid sulphate (niter cake) by dissolving the latter in water and adding to the solution thus formed a sufficient quantity of pulverized magnesium carbonate (magnesite) or pulverized dolomite (a mixture of calcium and magnesium carbonates) to render the same neutral or slightly alkaline. In lieu of these carbonates, I may employ as a neutralizing agent magnesium oxide (MgO) which may be obtained from calcining magnesite, or a mixture of CaO and MgO which may be obtained by calcining dolomite. In all of these cases, there is formed a mixture of normal sodium and magnesium sulphates which remain in solution. If dolomite be employed, either in a raw or calcined state, the lime content thereof will be thrown down in the form of a precipitate as insoluble calcium sulphate. The neutralized solution thus formed is then filtered so as to remove therefrom all precipitated matter. The clear liquor thus obtained is now ready for use. This liquor consists substantially of normal sodium sulphate and magnesium sulphate.

The two aqueous solutions having been prepared as above described, the solution containing the mixture of normal sodium sulphate and magnesium sulphate is added to the solution of calcium acid sulphite (during agitation) in such quantity that the sodium and magnesium sulphates will correspond to the calcium acid sulphite in the acid liquor. Reaction between the ingredients of the two solutions thus brought together takes place with the formation of insoluble crystallized calcium sulphate in the form of a white precipitate and a mixture of sodium and magnesium acid sulphites which remain in solution together with free sulphur dioxide.

When the aqueous solutions of sodium and magnesium sulphate and calcium acid sulphite are mixed together in a cold state, the calcium sulphate thus precipitated is of a light flocculent character, and in order to effect coalescence or aggregation of the particles thereof I preferably heat the mixture to a temperature of 120° F. The free sulphur dioxide is expelled by heat, preferably by blowing air through the liquor. The sulphur dioxide which is expelled is again used for the preparation of a fresh quantity of calcium acid sulphite. The precipitate consisting of crystallized calcium sulphate falls down in a dense form, leaving a clear supernatant liquid which consists substantially of a mixture of sodium and magnesium acid sulphites in solution which may be syphoned off in the usual manner.

2. I first produce calcium-magnesium acid sulphites in solution by reacting upon dolomite or dolomite lime with a sufficient quantity of sulphur dioxide in the presence of water. The solution thus formed is mixed with a solution of acid sodium sulphate (niter cake) or a solution of sodium sulphate (salt cake), a sufficient quantity of the solution of either of the latter substances being employed to supply the $SO_4$ ions necessary to precipitate all of the calcium ions of the calcium-magnesium acid sulphite.

When the aqueous solutions of sodium sulphate (or sodium acid sulphate) and calcium-magnesium acid sulphate are thus mixed together, if in a cold state, the calcium sulphate which is precipitated is of a light and flocculent character, and in order to effect the coalesence or aggregation of the particles thereof I preferably heat the m.ture to a temperature of not less than 120° F. The free sulphur dioxide which is present is expelled by the heat, preferably by blowing air through the liquid. The precipitate, consisting of calcium sulphate, as stated, falls down in a dense crystallized form, leaving a clear supernatant liquid which consists substantially of a mixture of sodium acid sulphite and magnesium acid sulphite in solution, which mixture is ready to be syphoned off and used in the digester.

What I claim as new is:

1. The method of preparing paper pulp from wood which comprises digesting particles of wood with a solution containing magnesium bisulphite, an alkali sulphite and an alkali bisulphite.

2. The method of preparing paper pulp from wood which comprises digesting particles of wood with a solution containing magnesium bisulphite, sodium sulphite and sodium bisulphite.

3. The method of preparing paper pulp from resinous woods which comprises digesting particles of resinous wood with a solution containing magnesium bisulphite, sodium sulphite and sodium bisulphite, in the substantial absence of calcium compounds.

4. The method of preparing paper pulp from woods which comprises digesting particles of wood with a solution containing magnesium bisulphite, an alkali bisulphite and $SO_3$ ions over and above those resulting from the dissociation of the magnesium and alkali bisulphites.

5. The method of preparing paper pulp from woods which comprises digesting particles of wood with a solution containing magnesium bisulphite, sodium bisulphite and $SO_3$ ions over and above those resulting from the dissociation of the magnesium and sodium bisulphites.

6. The method of preparing paper pulp from woods which comprises digesting particles of wood with a solution containing magnesium bisulphite, an alkali sulphite and an alkali bisulphite in the substantial absence of calcium compounds.

In testimony whereof I hereunto affix my signature.

JAMES BROOKES BEVERIDGE.